United States Patent
Morita et al.

(10) Patent No.: US 8,641,569 B2
(45) Date of Patent: Feb. 4, 2014

(54) REVOLVING APPARATUS FOR CONSTRUCTION MACHINE

(75) Inventors: Tomoharu Morita, Kasumigaura (JP); Nobuo Uzawa, Nagareyama (JP); Takeshi Kurihara, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/515,419

(22) PCT Filed: Apr. 22, 2011

(86) PCT No.: PCT/JP2011/059936
§ 371 (c)(1),
(2), (4) Date: Jun. 12, 2012

(87) PCT Pub. No.: WO2011/142235
PCT Pub. Date: Nov. 17, 2011

(65) Prior Publication Data
US 2013/0045828 A1    Feb. 21, 2013

(30) Foreign Application Priority Data

May 8, 2010 (JP) ................................. 2010-107789

(51) Int. Cl.
*F16H 57/04* (2010.01)
(52) U.S. Cl.
USPC ........... 475/159; 475/149; 475/331; 475/337; 475/348
(58) Field of Classification Search
USPC ........................ 475/149, 159, 331, 337, 348
See application file for complete search history.

(56) References Cited

U.S. PATENT DOCUMENTS

| | | | | | |
|---|---|---|---|---|---|
| 3,539,035 | A | * | 11/1970 | Wolkenstein | ............... 184/6.12 |
| 4,756,212 | A | * | 7/1988 | Fuehrer | ..................... 475/159 |
| 5,643,126 | A | | 7/1997 | Hotta et al. | |
| 2012/0309577 | A1 | * | 12/2012 | Komaru et al. | ............... 475/149 |
| 2013/0011233 | A1 | * | 1/2013 | Watanabe et al. | .......... 414/744.2 |
| 2013/0089400 | A1 | * | 4/2013 | Uzawa et al. | ............... 414/744.1 |
| 2013/0180809 | A1 | * | 7/2013 | Yabuuchi et al. | ............ 188/71.5 |

FOREIGN PATENT DOCUMENTS

| JP | 2-110747 U | 9/1990 |
|---|---|---|
| JP | 6-47764 U | 6/1994 |
| JP | 08-270766 A | 10/1996 |
| JP | 2003-035398 A | 2/2003 |
| JP | 2009-079627 A | 4/2009 |

\* cited by examiner

*Primary Examiner* — Derek D Knight
(74) *Attorney, Agent, or Firm* — Mattingly & Malur, PC

(57) ABSTRACT

A planetary gear reduction mechanism is provided in a housing for making up a revolving apparatus, and the planetary gear reduction mechanism is constituted by a sun gear, a plurality of planetary gears, and a carrier. Lubricating oil for lubricating the planetary gear reduction mechanism is stored in the housing. A doughnut-shaped guide member for covering meshing portions of the sun gear and the planetary gears and for receiving the lubricating oil scattered from the meshing portions and guiding it to planetary gear bearings is provided at an upper position of the planetary gear reduction mechanism. Hence, the lubricating oil which is scattered from the meshing portions of the sun gear and the planetary gears can be efficiently guided to the planetary gear bearings through the doughnut-shaped guide member.

6 Claims, 12 Drawing Sheets

REVOLVING APPARATUS FOR CONSTRUCTION MACHINE

TECHNICAL FIELD

The present invention relates to a revolving apparatus for a construction machine which is suitably used in a revolving type construction machine such as a hydraulic excavator, a hydraulic crane, or the like.

BACKGROUND ART

Generally, a construction machine such as a hydraulic excavator, a hydraulic crane, or the like is comprised of a lower traveling structure and an upper revolving structure mounted swingably on the lower traveling structure, and a revolving apparatus for revolvingly driving the upper revolving structure on the lower traveling structure is provided between the upper revolving structure and the lower traveling structure.

The revolving apparatus includes a tubular housing on an upper end side of which a revolving motor is provided and whose lower end side is mounted on the upper revolving structure; a planetary gear reduction mechanism provided in the housing to reduce the speed of rotation of the revolving motor; an output shaft which extends in the upper and lower direction within the housing and outputs the rotation whose speed has been reduced by the planetary gear reduction mechanism; and a pinion which is provided on a lower end side of the output shaft and meshes with an inner race of a revolving ring provided between the upper revolving structure and the lower traveling structure (Patent Document 1 and Patent Document 2).

In this case, the planetary gear reduction mechanism is constituted by a sun gear which rotates in synchronism with a rotational shaft of the revolving motor; a plurality of planetary gears which mesh with the sun gear and internal teeth (ring gear) provided on the inner side of the housing and revolve around the sun gear while rotating; and a carrier which has a plurality of support shafts for supporting the respective planetary gears, the planetary gears being respectively provided rotatably on these support shafts by means of planetary gear bearings. lubricating oil for lubricating the planetary gear reduction mechanism is stored in the housing.

It should be noted that, in the case of the revolving apparatus according to Patent Document 1, the planetary gear reduction mechanism is constituted by two stages of planetary gear reduction mechanisms which are coupled in series in a direction in which the torque is transmitted. Meanwhile, in the case of the revolving apparatus according to Patent Document 2, the planetary gear reduction mechanism is constituted by three stages of planetary gear reduction mechanisms which are coupled in series in the direction in which the torque is transmitted.

With the revolving apparatus according to this type of conventional art, if the sun gear of the planetary gear reduction mechanism is rotated by the revolving motor constituted by a hydraulic motor (in the case of Patent Document 1) or an electric motor (in the case of Patent Document 2), the respective planetary gears revolve around the sun gear while rotating, and the revolving force of these planetary gears is transmitted to the next-stage planetary gear reduction mechanism by means of the carrier. Accordingly, a large torque is transmitted to the output shaft through the carrier of the final-stage planetary gear reduction mechanism, the pinion provided on the output shaft revolves around the inner race of the revolving ring while meshing with internal teeth provided on the inner race, and the revolving force of this pinion is transmitted to the upper revolving structure side by means of the housing of the revolving apparatus. In consequence, the revolving apparatus is able to revolve the upper revolving structure with respect to the lower traveling structure at a low speed and a high torque.

Incidentally, during such revolving operation of the upper revolving structure, a rotational force associated with the rotational movement of the planetary gear and a reaction force associated with the revolving movement serving as a force for rotating the carrier are applied to the planetary gear bearing provided between each support shaft of the carrier and the planetary gear. For this reason, the revolving apparatus according to Patent Document 1 is constructed such that the planetary gear reduction mechanisms are immersed in lubricating oil held in the housing so that the planetary gears can be rotated smoothly over extended periods of time. Meanwhile, in the case of the revolving apparatus according to Patent Document 2, the construction provided is such that each support shaft for supporting the planetary gear is provided with an oil hole to allow lubricating oil to be circulated to the planetary gear bearing through this oil hole.

PRIOR ART DOCUMENTS

Patent Documents

Patent Document 1: Japanese Patent Laid-Open No. 2003-35398 A
Patent Document 2: Japanese Patent Laid-Open No. 2009-79627 A

SUMMARY OF THE INVENTION

With the revolving apparatus according to the above-described conventional art, since the planetary gear reduction mechanisms are so constructed as to be immersed in the lubricating oil held in the housing, if the sun gear is rotated at high speed by the revolving motor, the lubricating oil is scattered (spurted in conspicuous cases) upwardly from meshing portions of the sun gear and the planetary gears. In consequence, the lubricating oil around the planetary gear bearing for rotatably supporting each planetary gear becomes lacking, thereby making it unable to efficiently effect the lubrication of the planetary gear bearing. As a result, the planetary gear bearing is liable to be subjected to damage such as seizure, and therefore there is a possibility that it becomes impossible to sufficiently ensure the durability of the planetary gear bearing.

Meanwhile, in the case where the revolving motor is constituted by an electric motor, the lubricating oil which spurted upwardly from the meshing portions of the sun gear and the planetary gears may enter the interior of the electric motor, possibly causing a decline in such as the performance and durability of the electric motor.

Furthermore, with the revolving apparatus according to above-described Patent Document 2, the plurality of planetary gears are respectively supported by support shafts inside the housing, and an oil hole for allowing lubricating oil to circulate is provided at an upper end of each of the support shafts. For this reason, owing to the centrifugal force accompanying the rotation of the planetary gear reduction mechanism, the level of the lubricating oil stored in the housing is highest on the inner peripheral surface side of the housing and becomes low toward a central portion in a concavely conical shape (circular dish shape). As a result, the oil hole provided at the upper end of the support shaft is made to unfavorably project above the oil level, possibly causing a shortage of the amount of lubricating oil sent to the planetary gear bearing through this oil hole.

In view of the above-discussed problems with the conventional art, it is an object of the present invention to provide a revolving apparatus for a construction machine which makes it possible to efficiently effect the lubrication of planetary gear bearings for rotatably supporting the planetary gears for making up the planetary gear reduction mechanism.

(1) To overcome the above-described problems, the present invention is applied to a revolving apparatus for a construction machine including a tubular housing on an upper end side of which a revolving motor is provided and whose lower end side is mounted on an upper revolving structure; a planetary gear reduction mechanism provided in the housing to reduce the speed of rotation of the revolving motor; an output shaft which extends in the upper and lower direction within the housing and outputs the rotation whose speed has been reduced by the planetary gear reduction mechanism; and a pinion which is provided on a lower end side of the output shaft and meshes with an inner race of a revolving ring provided between the upper revolving structure and a lower traveling structure; wherein the planetary gear reduction mechanism being constituted by a sun gear, a plurality of planetary gears which mesh with the sun gear and internal teeth provided on an inner side of the housing and revolve around the sun gear while rotating, and a carrier which has a plurality of support shafts for supporting the respective planetary gears, the planetary gears being respectively provided rotatably on the support shafts by means of planetary gear bearings, lubricating oil for lubricating the planetary gear reduction mechanism being held in the housing.

Further, the characteristic of the construction adopted in the present invention lies in that a lubricating oil guide member for covering meshing portions of the sun gear and the planetary gears and for receiving the lubricating oil scattered (or spurted in conspicuous cases) from the meshing portions and guiding the same to the planetary gear bearings is arranged to be provided at an upper position of the planetary gear reduction mechanism.

Thus, since the lubricating oil guide member is arranged to be provided at an upper position of the planetary gear reduction mechanism, the lubricating oil which scattered (or spurted in conspicuous cases) from the meshing portions of the sun gear and the planetary gears can be received by this lubricating oil guide member, and this lubricating oil can be guided to the planetary gear bearings which rotatably support the planetary gears. For this reason, the lubrication of these planetary gear bearings can be effected efficiently, thereby making it possible to enhance the durability of these planetary gear bearings and improve the life of the revolving apparatus.

In addition, the lubricating oil guide member makes it possible to restrain the lubricating oil which scattered or spurted from becoming attached to the revolving motor provided above the planetary gear reduction mechanism or from entering the interior of the revolving motor. For this reason, even in the case where the revolving motor is constituted by an electric motor, it is possible to prevent a decline in such as the performance and the durability of the electric motor due to the ingress of the lubricating oil, thereby making it possible to enhance the reliability of the revolving apparatus.

(2) According to the present invention, the lubricating oil guide member is constituted by a doughnut-shaped guide member (annular guide member) which has a shaft through hole for a rotational shaft of the revolving motor to be inserted therethrough and covers the meshing portions of the sun gear and the planetary gears over an entire circumference.

Thus, since the lubricating oil guide member is constituted by a doughnut-shaped guide member (annular guide member), the meshing portions of the sun gear and the planetary gears can be covered over the entire circumference, so that the lubricating oil which scattered or spurted from these meshing portions can be received reliably. For this reason, it is possible to guide a large amount of lubricating oil to the planetary gear bearings and more reliably prevent the ingress of the lubricating oil onto the electric motor.

(3) According to the present invention, a flange portion extending toward an inner peripheral surface of the housing is arranged to be provided on an outer peripheral side of the lubricating oil guide member over an entire circumference.

Thus, since the flange portion is arranged to be provided on the outer peripheral side of the lubricating oil guide member over the entire circumference, this flange portion makes it possible to restrain the level of the lubricating oil in the vicinity of the inner peripheral surface of the housing from rising and prevent the level of the lubricating oil from becoming inclined in a concavely conical shape (circular dish shape) in conjunction with the rotation of the planetary gear reduction mechanism. As a result, it is possible to allow the meshing portions of the sun gear and the planetary gears to be constantly immersed in the lubricating oil, making it possible to reliably lubricate the meshing portions of the sun gear and the planetary gears.

(4) According to the present invention, the lubricating oil guide member is formed by segmentary guide members which is divided into a plurality of segments, the meshing portions of the sun gear and the planetary gears being arranged to be individually covered by the segmentary guide members.

Thus, since the lubricating oil guide member is constituted by the segmentary guide members, in the event that any one of the segmentary guide members has been damaged, it suffices to replace only that damaged segmentary guide member, and the other segmentary guide members can continue to be used intact as they are. For this reason, the replacement of the lubricating oil guide member can be performed easily, and the cost required for replacement can be reduced.

(5) According to the present invention, the lubricating oil guide member is constituted by a bottom plate portion which is mounted on the carrier; a covering plate portion which rises upwardly from the bottom plate portion, extends toward the rotational shaft of the revolving motor, and covers the meshing portions of the sun gear and the planetary gears; and lubricating oil passages which are provided in the bottom plate portion and guide to the planetary gear bearings the lubricating oil which flowed down to the bottom plate portion side along the covering plate portion.

In consequence, the lubricating oil which scattered or spurted from the meshing portions of the sun gear and the planetary gears can be reliably received by the covering plate portion, and the lubricating oil received by this covering plate portion can be reliably guided to the planetary gear bearings through the lubricating oil passages.

(6) According to the present invention, an oil hole for guiding the lubricating oil to the planetary gear bearing is provided in the support shaft of the carrier, and the lubricating oil passages of the lubricating oil guide member are each arranged to be provided at a position corresponding to the oil hole of the support shaft. In consequence, the lubricating oil guided to the lubricating oil passages of the lubricating oil guide member can be reliably guided to the planetary gear bearings through the oil hole.

(7) According to the present invention, a plurality of partition plates which form pairs by being located on radially opposite sides of the respective support shafts of the carrier so as to partition a space between the bottom plate portion and the covering plate portion is provided between the bottom plate portion and the covering plate portion for making up the lubricating oil guide member, each of the lubricating oil passages being arranged to be provided between the partition plates.

Thus, since partition plates are arranged to be provided between the covering plate portion and the bottom plate portion, it is possible to secure the strength of the lubricating oil guide member by virtue of these partition plates. Meanwhile, since the lubricating oil which is attached to the covering plate portion and flowing in the rotating direction of the carrier can be blocked by the partition plates, and this lubricating oil can be guided to the lubricating oil passages, it is possible to efficiently effect the lubrication of the planetary gear bearings. Moreover, since the lubricating oil passages are respectively provided between adjacent ones of the partition plates which form pairs, whichever direction the rotating direction of the lubricating oil guide member mounted on the carrier may be (whether it may be forward or reverse), the lubricating oil can be reliably guided to the lubricating oil passages by these partition plates which is on the backward side in the rotating direction, thereby making it possible to effect the lubrication of the planetary gear bearings more efficiently.

BRIEF DESCRIPTION OF THE DRAWINGS

FIG. 12 is an enlarged cross-sectional view of essential portions at a position similar to that of FIG. 4 and illustrating the sun gear, the planetary gear, the carrier, the support shaft, the oil hole, the planetary gear bearing, the segmentary guide member, the lubricating oil passage, and the like.

MODE FOR CARRYING OUT THE INVENTION

Hereafter, a revolving apparatus for a construction machine to be applied to an embodiment in the present invention will be in detail explained with reference to the accompanying drawings by taking a case in which the revolving apparatus for a construction machine is applied to a hydraulic excavator as an example.

FIGS. 1 to 9 show a first embodiment of the revolving apparatus for a construction machine in accordance with the present invention.

Figure 1:
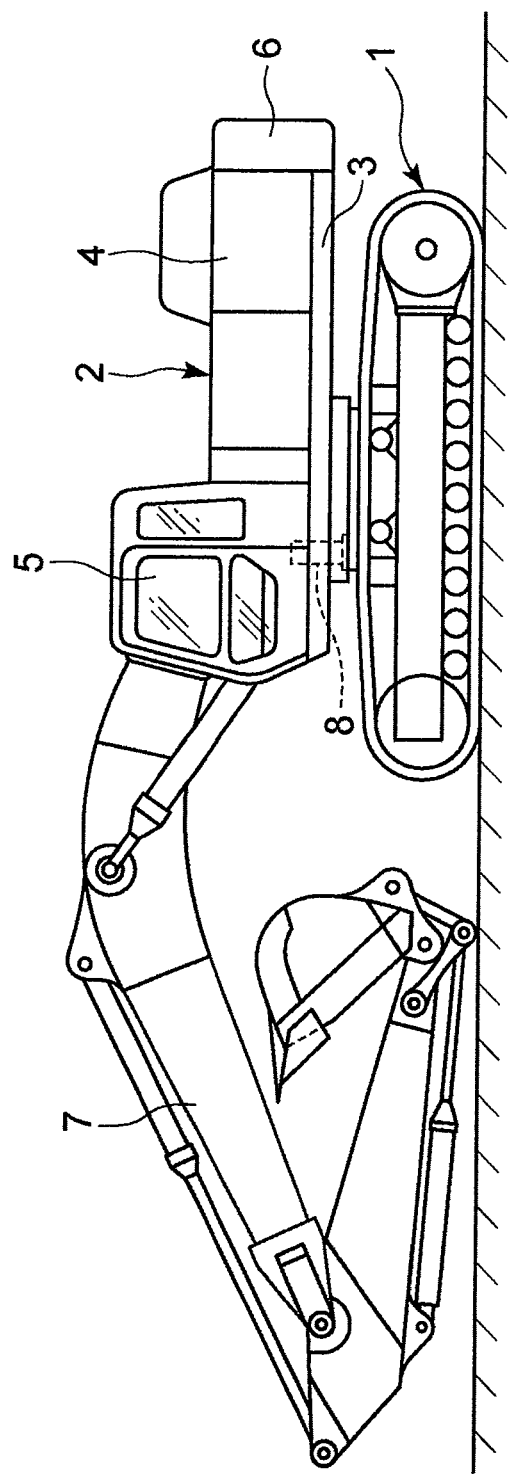
FIG. 1 is a front view illustrating a hydraulic excavator to which a revolving apparatus in accordance with a first embodiment of the present invention is applied.

In FIG. 1, designated at 1 is a lower traveling structure of the hydraulic excavator, and designated at 2 is an upper revolving structure mounted swingably on the lower traveling structure 1. The upper revolving structure 2 has a revolving frame 3, and a housing cover 4, a cab box 5, a counterweight 6, and the like are provided on the revolving frame 3. A working mechanism 7 for performing such as the operation of excavating earth and sand is provided liftably on the front side of the revolving frame 3.

Figure 2:
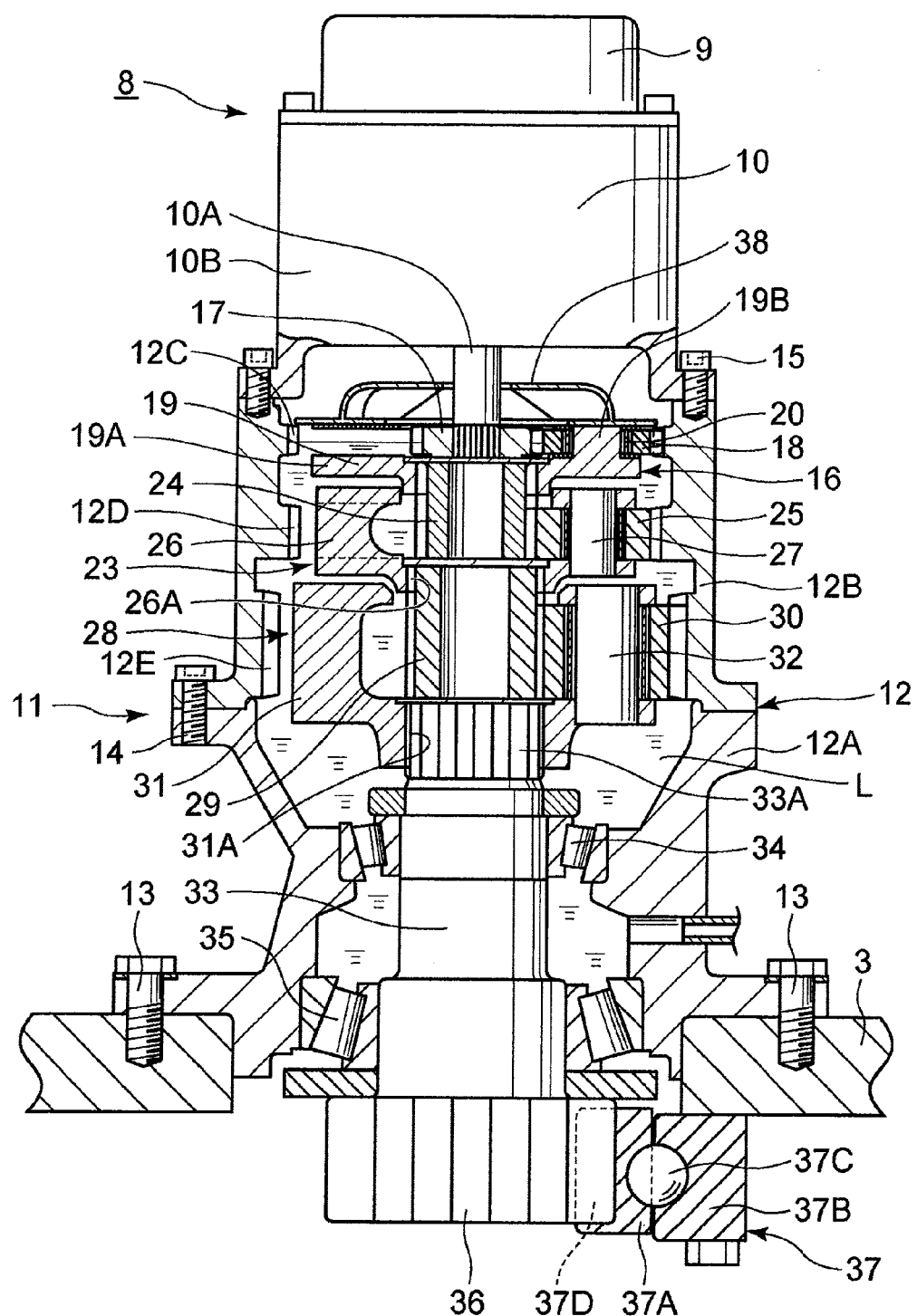
FIG. 2 is a longitudinal sectional cross-sectional view illustrating the revolving apparatus.

Designated at 8 is a revolving apparatus which is provided between the lower traveling structure 1 and the upper revolving structure 2. As shown in FIG. 2, the revolving apparatus 8 is largely constituted by a mechanical brake 9, an electric motor 10 as a revolving motor, a below-described reduction device 11, and a revolving ring 37.

Designated at 11 is the reduction device consisting of three reduction stages, and the reduction device 11 reduces the speed of rotation of a rotational shaft 10A of the electric motor 10 and outputs the reduced speed to an output shaft 33. The reduction device 11 is constituted by such as a housing 12, planetary gear reduction mechanisms 16, 23, and 28, and the output shaft 33 which will be described hereinafter.

Denoted at 12 is the tubular housing which is disposed in the upper and lower direction on the revolving frame 3 of the upper revolving structure 2, and the housing 12 is largely constituted by a lower housing 12A mounted on the upper surface side of the revolving frame 3 by using bolts 13 and an upper housing 12B mounted on the lower housing 12A by using bolts 14. A casing 10B of the electric motor 10 is arranged to be mounted at an upper end opening of the upper housing 12B by using bolts 15.

Lubricating oil L for lubricating the below-described planetary gear reduction mechanisms 16, 23, and 28 is held in the housing 12, as will be described hereinafter. For this reason, a seal member (not shown) is liquid-tightly provided between an inner peripheral surface of the lower housing 12A and an outer peripheral surface of the below-described output shaft 33, and the lubricating oil L is accommodated in the housing 12 in such a measure as to allow the planetary gear reduction mechanisms 16, 23, and 28 to be immersed therein.

Next, the planetary gear reduction mechanisms 16, 23, and 28 of the respective stages provided in the housing 12 of the housing 12 of the reduction device 11 will be explained.

Denoted at 16 is the first-stage planetary gear reduction mechanism provided in the housing 12 by being located on the lower side of the electric motor 10. The planetary gear reduction mechanism 16 is constituted by such as a sun gear 17, planetary gears 18, and a carrier 19 which will be described hereinafter.

Indicated at 17 is the sun gear which is spline-coupled to the rotational shaft 10A of the electric motor 10, and the sun gear 17 is rotatably disposed on a below-described sun gear 24. Further, the sun gear 17 is adapted to rotate integrally with the rotational shaft 10A of the electric motor 10 to transmit this rotation to each of the below-described planetary gears 18.

Indicated at 18 are three, for example, planetary gears (only one is shown) which mesh with both internal teeth (ring gear) 12C provided on the inner side of the housing 12 and the sun gear 17. These planetary gears 18 are rotatably supported by respective support shafts 19B of the below-described carrier 19 by means of planetary gear bearings 20. As the sun gear 17 rotates, the planetary gears 18 are adapted to revolve around the sun gear 17 while rotating.

Indicated at 19 is the carrier which rotatably supports the planetary gears 18, and the carrier 19 is constituted by a disk-shaped support plate 19A of a diameter smaller than the addendum circle diameter of the internal teeth 12C and by three, for example, cylindrical column-shaped support shafts 19B which are provided projectingly on the upper surface side of that support plate 19A. These support shafts 19B are supported by the support plate 19A in a cantilevered manner only at their proximal end sides (lower end sides), and the planetary gears 18 are respectively provided rotatably on these support shafts 19B by means of the planetary gear bearings 20.

A screw hole 19C is respectively formed in a distal end face (upper end face) of each of the support shafts 19B, and the arrangement provided is such that a below-described doughnut-shaped guide member (annular guide member) 38 is fixed to the upper end face of each support shaft 19B by using a coupling screw 21 which is threadedly engaged with each screw hole 19C.

Figure 4:
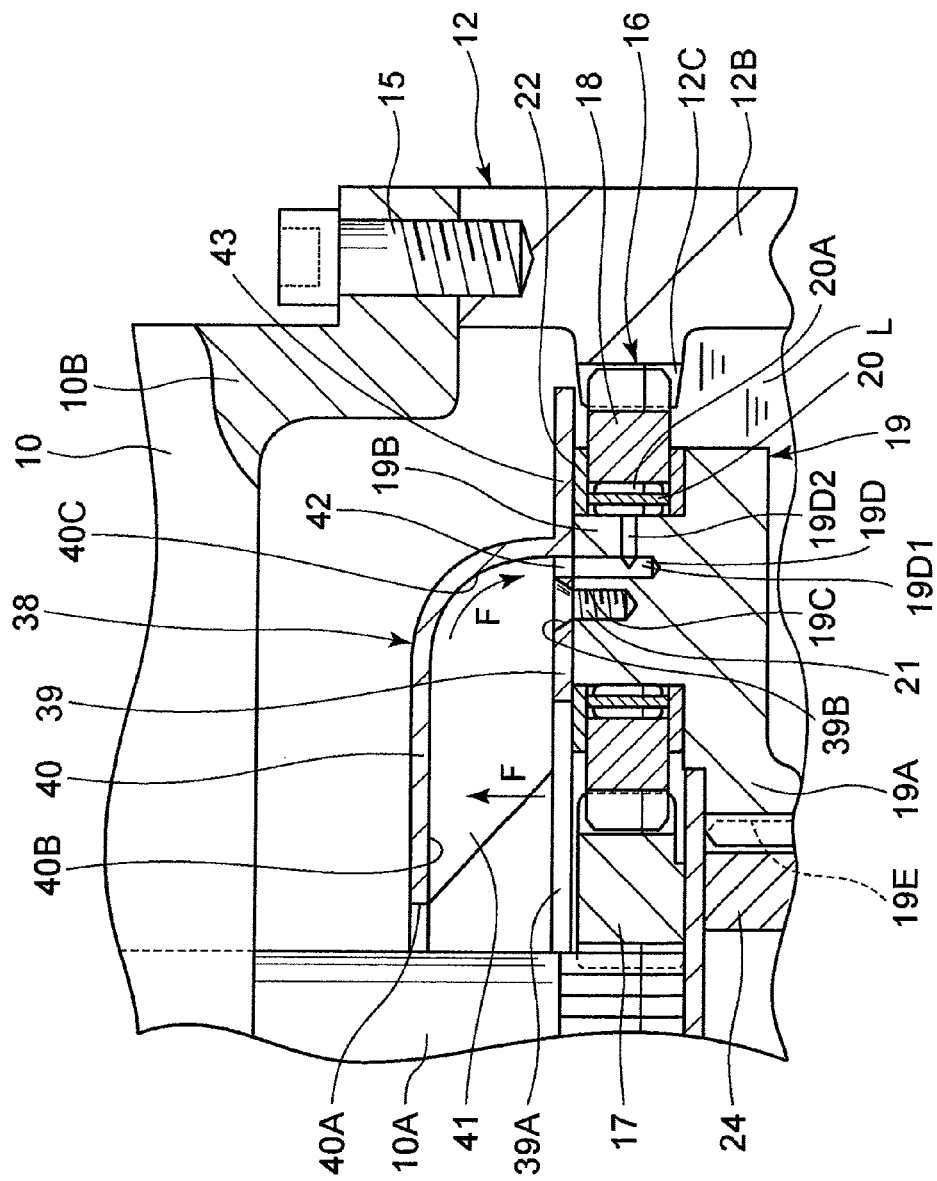
FIG. 4 is an enlarged cross-sectional view of essential portions, illustrating a sun gear, a planetary gear, a carrier, a support shaft, an oil hole, a planetary gear bearing, a doughnut-shaped guide member, a lubricating oil passage, and the like shown in FIG. 3.

Furthermore, an oil hole 19D for guiding the lubricating oil L to the planetary gear bearing 20 is provided in each support shaft 19B. As shown in FIG. 4, this oil hole 19D is constituted by a longitudinal hole 19D1 which is open at the distal end face of each support shaft 19B and extends parallel to the central axis of each of these support shafts 19B and by a lateral hole 19D2 which extends in the direction perpendicular to the central axis of each of the support shafts 19B and has one end communicating with the longitudinal hole 19D1 and the other end opening at an outer peripheral surface of each of the support shafts 19B at a position opposing the planetary gear bearing 20.

Meanwhile, a hole spline portion 19E is formed in a central portion of the support plate 19A, and this hole spline portion 19E is arranged to be spline-coupled to the below-described sun gear 24. Accordingly, the carrier 19 rotatably supports the planetary gears 18 by means of the respective support shafts 19B, and as these planetary gears 18 revolve around the sun gear 17, the carrier 19 rotates to transmit this rotation to the sun gear 24.

Indicated at 20 are the planetary gear bearings which are each provided between the respective support shaft 19B of the carrier 19 and the respective planetary gear 18, and each of these planetary gear bearings 20 is constituted by a needle bearing having a plurality of needles 20A which are in contact with the outer peripheral surface of the respective support shaft 19B and the inner peripheral surface of the respective planetary gear 18. The planetary gear bearing referred to herein is a bearing which rotatably supports the planetary gear 18 with respect to the support shaft 19B of the carrier 19.

Indicated at 22 is a plate which is mounted on a distal end side (upper end side) of each support shaft 19B of the carrier 19. The plate 22 is for reducing sliding resistance with respect to an upper surface of each planetary gear 18 and for reducing sliding resistance with respect to the below-described doughnut-shaped guide member 38. Meanwhile, the plate 22 also has the function of preventing each planetary gear 18 from coming off each support shaft 19B in the axial direction in cooperation with the doughnut-shaped guide member 38 which is mounted on the carrier 19 by using the coupling screws 21.

Denoted at 23 is the second-stage (middle-stage) planetary gear reduction mechanism provided in the housing 12 by being located on the lower side of the first-stage planetary gear reduction mechanism 16. The planetary gear reduction mechanism 23 is constituted by such as the sun gear 24, planetary gears 25, and a carrier 26 which will be described hereinafter.

Indicated at 24 is the sun gear which is spline-coupled to the hole spline portion 19E of the first-stage carrier 19, and the sun gear 24 is rotatably disposed on a below-described sun gear 29. The sun gear 24 is adapted to rotate integrally with the first-stage carrier 19 to transmit this rotation to each of the below-described planetary gears 25.

Indicated at 25 are the plurality of planetary gears (only one is shown) which are rotatably supported by the below-described carrier 26. These planetary gears 25 mesh with both internal teeth (ring gear) 12D provided on the inner side of the housing 12 and the sun gear 24. As the sun gear 24 rotates, the planetary gears 25 are adapted to revolve around the sun gear 24 while rotating.

Indicated at 26 is the carrier for rotatably supporting the planetary gears 25, and a hole spline portion 26A which is spline-coupled to the sun gear 29 is formed in a central portion of that carrier 26. A plurality of pins 27 (only one is shown) are fixed to the carrier 26 in a doubly supported manner in such a way as to surround the hole spline portion 26A.

Accordingly, according to the second-stage planetary gear reduction mechanism 23, the carrier 26 rotatably supports the planetary gears 25 by means of the respective pins 27, and as these planetary gears 25 revolve around the sun gear 24 while rotating, the carrier 26 transmits the revolving force of these planetary gears 25 to the sun gear 29.

Denoted at 28 is the third-stage (final-stage) planetary gear reduction mechanism provided in the housing 12 by being located on the lower side of the second-stage planetary gear reduction mechanism 23. The planetary gear reduction mechanism 28 is constituted by such as the sun gear 29, planetary gears 30, and a carrier 31 which will be described hereinafter.

Indicated at 29 is the sun gear which is spline-coupled to the hole spline portion 26A of the second-stage carrier 26, and the sun gear 29 is rotatably disposed on the below-described output shaft 33. The sun gear 29 is adapted to rotate integrally with the second-stage carrier 26 to transmit this rotation to each of the below-described planetary gears 30.

Indicated at 30 are the plurality of planetary gears (only one is shown) which are rotatably supported by the below-described carrier 31. These planetary gears 30 mesh with both internal teeth (ring gear) 12E provided on the inner side of the housing 12 and the sun gear 29. As the sun gear 29 rotates, the planetary gears 30 are adapted to revolve around the sun gear 29 while rotating.

Indicated at 31 is the carrier for rotatably supporting the planetary gears 30, and a hole spline portion 31A which is spline-coupled to a shaft spline portion 33A of the below-described output shaft 33 is formed in the carrier 31. A plurality of pins 32 (only one is shown) are fixed to the carrier 31 in a doubly supported manner in such a way as to surround the hole spline portion 31A.

Accordingly, according to the third-stage planetary gear reduction mechanism 28, the carrier 31 rotatably supports the planetary gears 30 by means of the respective pins 32, and as these planetary gears 30 revolve around the sun gear 29 while rotating, the carrier 31 transmits the revolving force of these planetary gears 30 to the output shaft 33.

Denoted at 33 is the output shaft which extends in the upper and lower direction within the housing 12. The output shaft 33 is mounted rotatably in the lower housing 12A by means of an upper bearing 34 and a lower bearing 35 and is adapted to output the rotation of the electric motor 10 by reducing the speed in three stages by the planetary gear reduction mechanisms 16, 23, and 28.

Here, the shaft spline portion 33A, which projects upwardly from the upper bearing 34, is integrally provided on one axial side (upper side) of the output shaft 33. This shaft spline portion 33A is spline-coupled to the hole spline portion 31A provided in the third-stage carrier 31.

Denoted at 36 is a pinion which is integrally provided on a lower end side of the output shaft 33, and the pinion 36 projects downwardly from the housing 12 and meshes with internal teeth 37D of the below-described revolving ring 37. This pinion 36 is adapted to transmit to an inner race 37A of the below-described revolving ring 37 the rotation of the output shaft 33 whose speed has been reduced in three stages by the planetary gear reduction mechanisms 16, 23, and 28.

It should be noted that the lubricating oil L for lubricating the planetary gear reduction mechanisms 16, 23, and 28, the upper bearing 34, and the lower bearing 35 is held in the housing 12. The level of this lubricating oil L reaches a level at which the sun gear 17, the planetary gears 18, and the like making up the first-stage planetary gear reduction mechanism 16 are immersed about halfway.

Denoted at 37 is the revolving ring which is provided between the upper revolving structure 2 and the lower traveling structure 1. The revolving ring 37 is constituted by the inner race 37A which is secured to a circle member (not shown) of the lower traveling structure 1, an outer race 37B which is secured to the underside of the revolving frame 3, and a plurality of steel balls 37C (only one is shown) which are disposed between the inner race 37A and the outer race 37B. The internal teeth 37D are formed on the inner peripheral side of the inner race 37A over the entire circumference. Here, as the internal teeth 37D formed on the inner race 37A mesh with the pinion 36 of the output shaft 33, the revolving ring 37 is adapted to rotate the outer race 37B relative to the inner race 37A in correspondence with the rotation of the output shaft 33 to revolve the upper revolving structure 2 on the lower traveling structure 1.

Next, the lubricating oil guide member 38 used in the embodiment will be explained.

Figure 3:
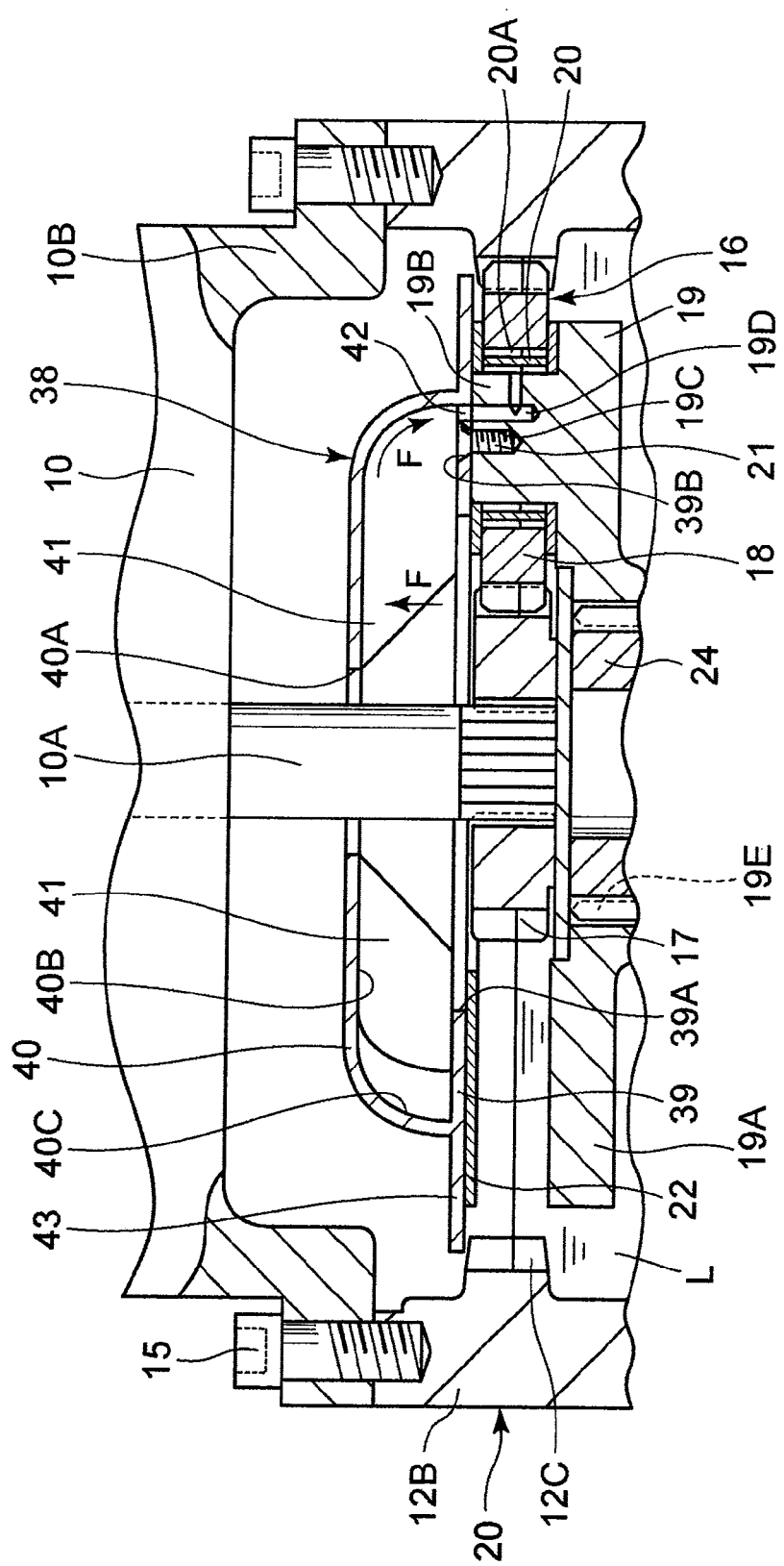
FIG. 3 is an enlarged cross-sectional view illustrating a revolving motor, a housing, a planetary gear reduction mechanism, a doughnut-shaped guide member, and the like shown in FIG. 2.
Figure 5:
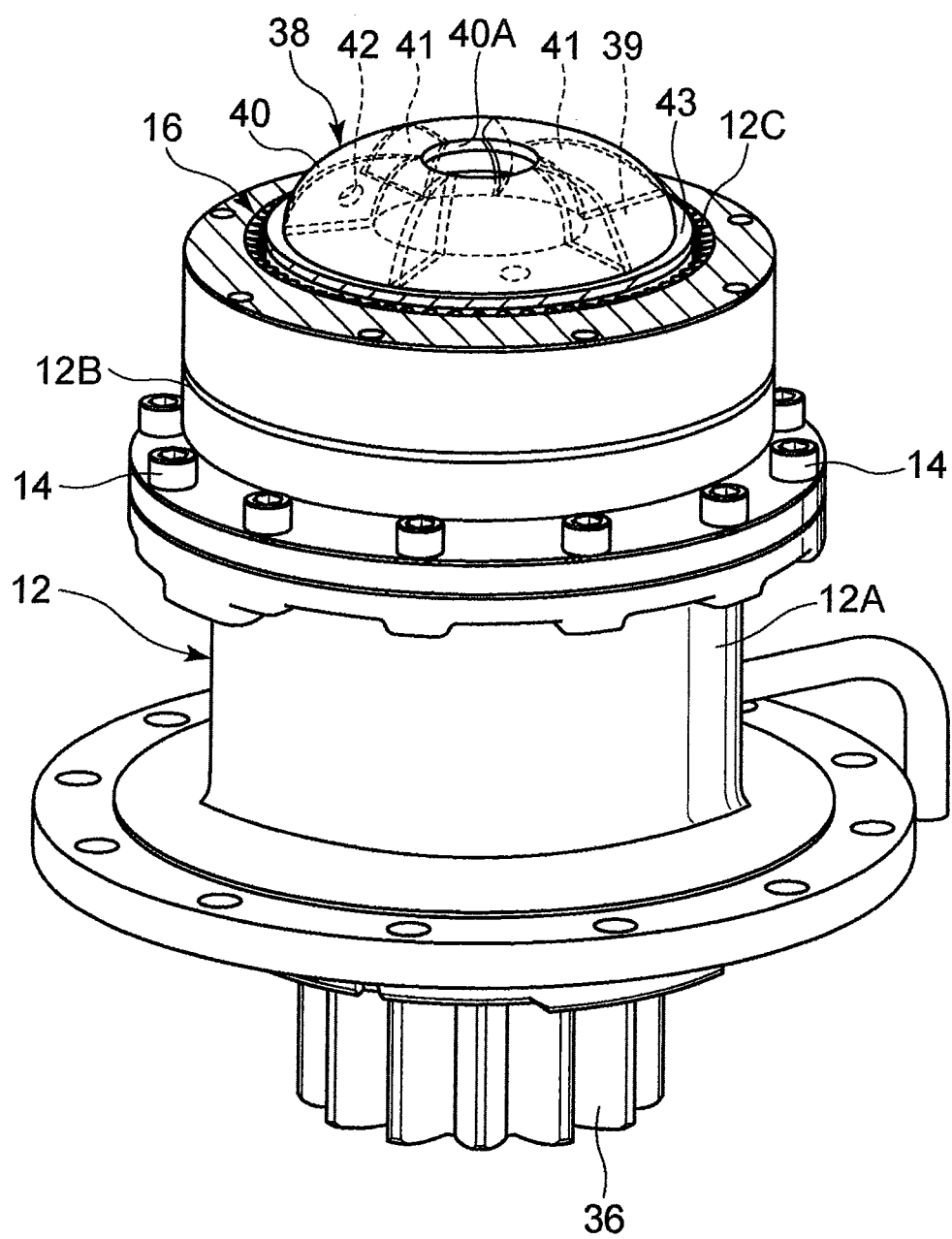
FIG. 5 is a perspective view illustrating the housing, the doughnut-shaped guide member, the pinion, and the like in a state in which an upper end of the housing is sectioned.
Figure 6:
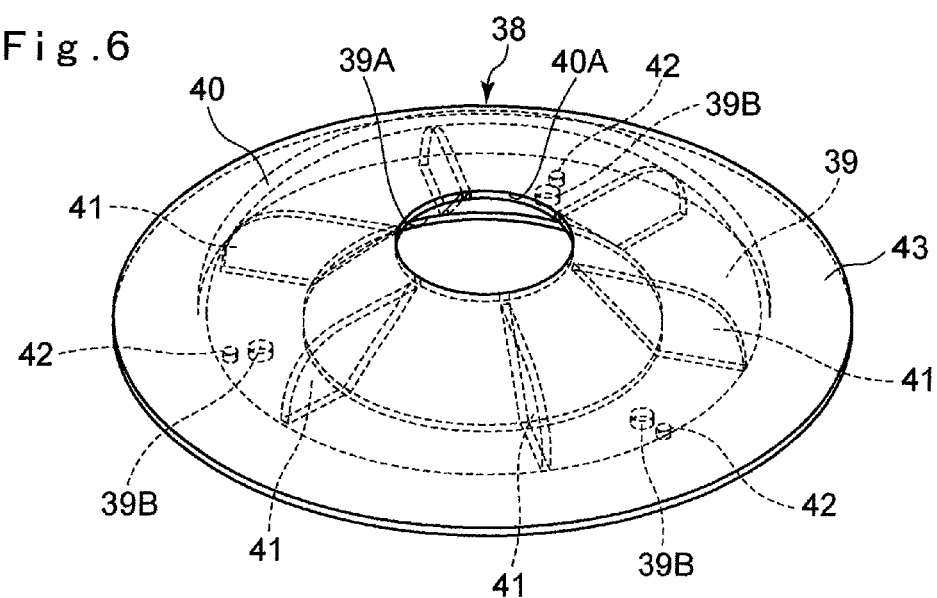
FIG. 6 is a perspective view illustrating the doughnut-shaped guide member as a single unit.
Figure 7:
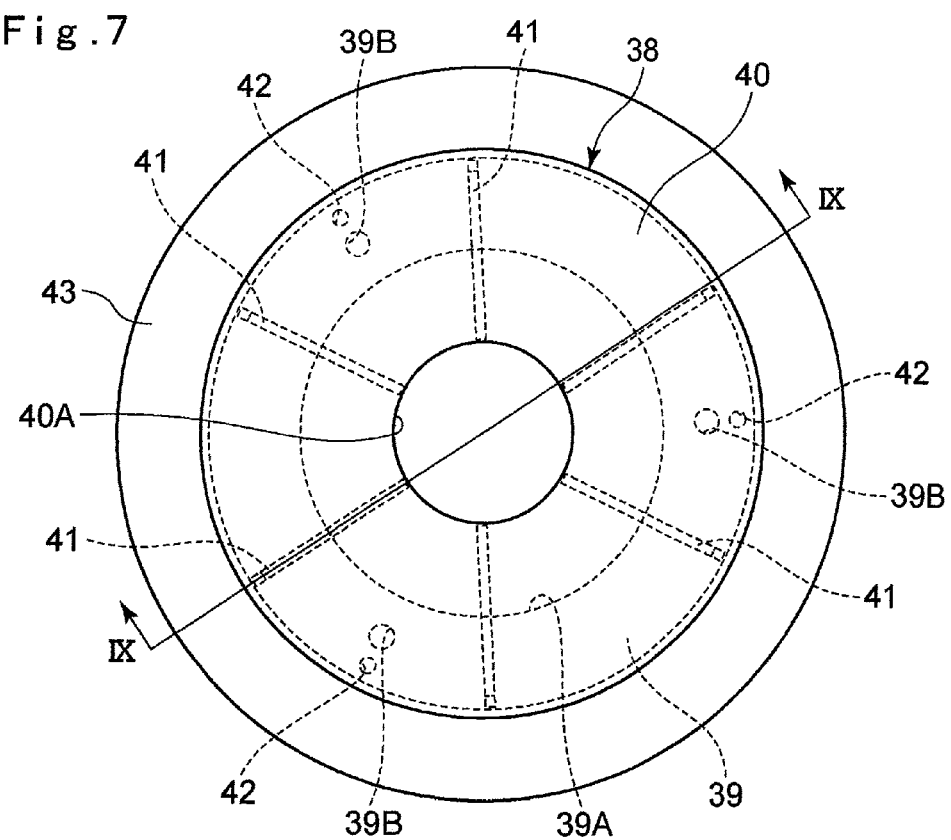
FIG. 7 is a plan view of the doughnut-shaped guide member.
Figure 8:
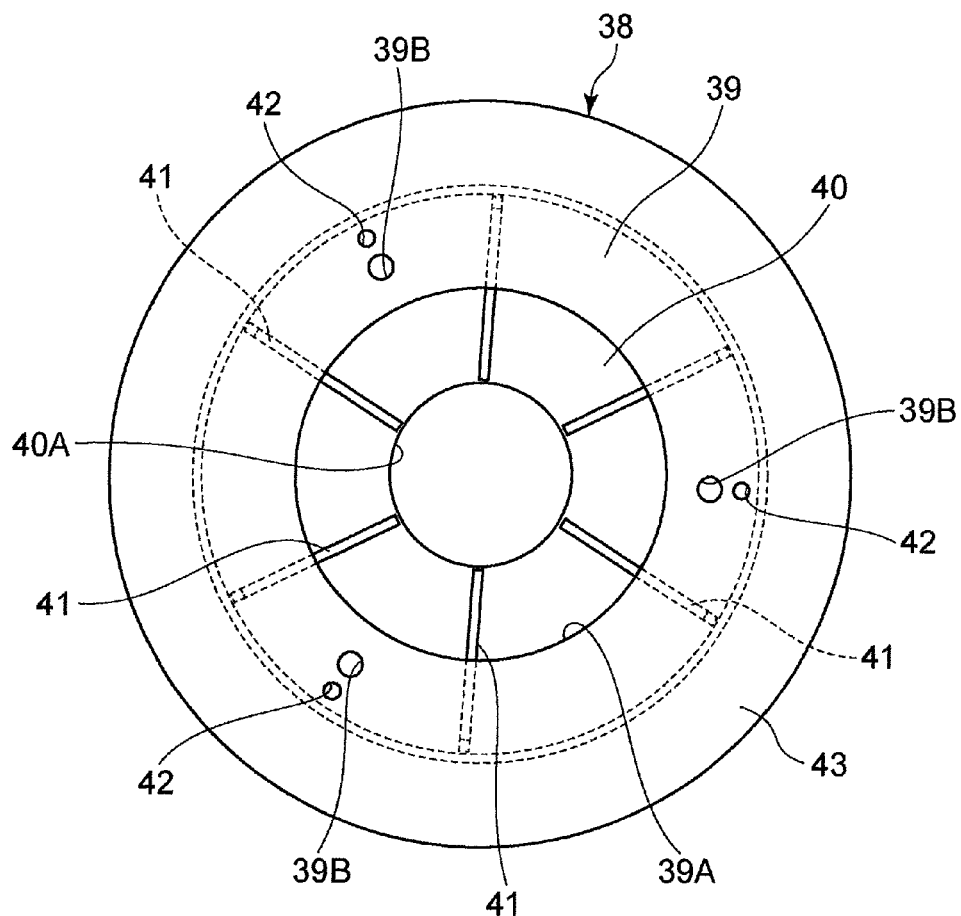
FIG. 8 is a bottom view of the doughnut-shaped guide member.

Namely, designated at 38 is the doughnut-shaped guide member (annular guide member) serving as the lubricating oil guide member. As shown in FIGS. 3 to 5, the doughnut-shaped guide member 38 is provided at an upper position of the first-stage planetary gear reduction mechanism 16, covers meshing portions of the sun gear 17 and the planetary gears 18, and receives the lubricating oil L scattered or spurted from these meshing portions and guides it to the planetary gear bearings 20. This doughnut-shaped guide member 38 is fabricated from a material which is lightweight and has strength, such as a synthetic resin, an aluminum alloy, or the like, and is largely constituted by a bottom plate portion 39, a covering plate portion 40, a plurality of partition plates 41, lubricating oil passages 42, and a flange portion 43.

Indicated at 39 is the annular bottom plate portion which is mounted on the carrier 19 of the planetary gear reduction mechanism 16, and the bottom plate portion 39 has in its central portion a shaft through hole 39A through which the rotational shaft 10A of the electric motor 10 is inserted. In the bottom plate portion 39, screw through holes 39B are respectively provided at positions corresponding to the screw holes 19C of the support shafts 19B. Here, to describe a method of mounting the doughnut-shaped guide member 38, the bottom plate portion 39 can be mounted on the carrier 19 by allowing the coupling screws 21 to be threadedly engaged with the screw holes 19C through the screw through holes 39B.

Indicated at 40 is the annular covering plate portion which covers the meshing portions of the sun gear 17 and the planetary gears 18. This covering plate portion 40 is formed in a substantially convexly curved shape (dome shape) rising upwardly from the bottom plate portion 39 and extending toward the rotational shaft 10A of the electric motor 10, and a shaft through hole 40A, through which the rotational shaft 10A is inserted, is provided in a central portion thereof. In this instance, the inside diameter of this shaft through hole 40A is set to be smaller than the inside diameter of an imaginary circle (reference pitch circle of the sun gear 17) connecting the meshing portions of the sun gear 17 and the planetary gears 18.

Figure 9:
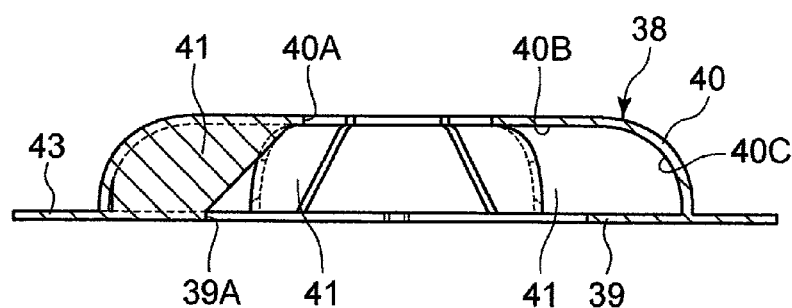
FIG. 9 is a cross-sectional view, taken from the direction of arrows IX-IX in FIG. 7, of the doughnut-shaped guide member.

Meanwhile, as shown in FIG. 9, as for the inner surface of the covering plate portion 40, its inside diameter side is formed as a horizontal surface 40B which is parallel to the upper surface of the bottom plate portion 39, while its outside diameter side is formed as a concaved surface 40C continuing from this horizontal surface 40B to the upper surface of the bottom plate portion 39. Here, the arrangement provided is such that, as indicated by arrows F in FIGS. 3 and 4, the lubricating oil L which scattered or spurted from the meshing portions of the sun gear 17 and the planetary gears 18 during the operation of the revolving apparatus 8 collides against the horizontal surface 40B, subsequently flows down onto the upper surface of the bottom plate portion 39 along the concaved surface 40C owing to the centrifugal force accompanying the rotation of the carrier 19, and is guided to the below-described lubricating oil passages 42.

It should be noted that, tool insertion holes (not shown) are respectively provided in the covering plate portion 40 at positions which correspond to the respective screw through holes 39B of the bottom plate portion 39 in the upper and lower direction. Further, the arrangement provided is such that the coupling screw 21 is threadedly inserted into the screw hole 19C of the carrier 19 (support shaft 19B) through this tool insertion hole and is fastened by using a tool such as a screwdriver, so as to mount the bottom plate portion 39 of the doughnut-shaped guide member 38 to each support shaft 19B. After the doughnut-shaped guide member 38 is thus mounted by using the coupling screws 21, the tool insertion holes are preferably blocked by using sealing plugs or the like.

Indicated at 41 are the plurality of (for example, six) partition plates which are provided between the bottom plate portion 39 and the covering plate portion 40. The partition plates 41 are for radially partitioning the annular space between the bottom plate portion 39 and the covering plate portion 40. Here, the partition plates 41 are provided in such a manner as to form pairs by being located on radially opposite sides of the respective support shafts 19B of the carrier 19, and function to block the lubricating oil L flowing in the circumferential direction after being attached to the horizontal surface 40B and the concaved surface 40C of the covering plate portion 40 so as to guide the lubricating oil L to the below-described lubricating oil passages 42.

Denoted at 42 are the lubricating oil passages which are provided in the bottom plate portion 39 radially inwardly of the proximal end portion of the covering plate portion 40. These lubricating oil passages 42 are located between the partition plates 41 which form pairs by being located on radially opposite sides of the respective support shafts 19B of the carrier 19, and are provided at positions corresponding to the oil holes 19D provided in the support shafts 19B. Namely, the arrangement is provided so that in the state in which the bottom plate portion 39 of the doughnut-shaped guide member 38 is mounted on the support shafts 19B of the carrier 19 by using the coupling screws 21, and the lubricating oil passages 42 communicate with the oil holes 19D provided in the support shafts 19B, respectively. Accordingly, the arrangement provided is such that, during the operation of the revolving apparatus 8, the lubricating oil L which flowed down to the bottom plate portion 39 side along the inner surface of the covering plate portion 40 and the side surfaces of the partition plates 41 is guided to the planetary gear bearings 20 through the lubricating oil passages 42 and the oil holes 19D.

Indicated at 43 is the flange portion which is provided on the outer peripheral side of the doughnut-shaped guide member 38 over the entire circumference. This flange portion 43 is formed such that the bottom plate portion 39 is extended from the connecting portion between the bottom plate portion 39 and the covering plate portion 40 to the outside diameter side. Namely, the flange portion 43 extends annularly from the connecting portion between the bottom plate portion 39 and the covering plate portion 40 to the inner peripheral surface of the housing 12, and an outer peripheral edge portion of the flange portion 43 extends to a position where meshing portions of the internal teeth 12C of the housing 12 and the respective planetary gears 18 are covered. Accordingly, the flange portion 43 has the function of suppressing the level of the lubricating oil L in the vicinity of the inner peripheral surface of the housing 12 from rising and becoming inclined in a concavely conical shape (circular dish shape) due to the centrifugal force accompanying the rotation of the carrier 19 and the like, and ensures that the meshing portions of the sun gear 17 and the planetary gears 18 of the first stage can be reliably lubricated.

The revolving apparatus 8 in accordance with the first embodiment has the above-described construction, and when the rotational shaft 10A of the electric motor 10 rotates, the rotation of this rotational shaft 10A is transmitted to the output shaft 33 with its speed reduced in three stages by the planetary gear reduction mechanisms 16, 23, and 28, so that the pinion 36 rotates with a large rotational force (torque).

The pinion 36 revolves along the inner race 37A of the revolving ring 37 while meshing with the internal teeth 37D provided on the inner race 37A. As the revolving force of this pinion 36 is transmitted to the revolving frame 3 through the housing 12, the entire upper revolving structure 2 revolves on the lower traveling structure 1.

During the operation of this revolving apparatus 8, the rotational shaft 10A of the electric motor 10 rotates at high speed, and the lubricating oil L is scattered or spurted upwardly from the meshing portions of the sun gear 17 and the planetary gears 18 making up the first-stage planetary gear reduction mechanism 16.

At this time, the doughnut-shaped guide member 38 mounted above the first-stage planetary gear reduction mechanism 16 receives the lubricating oil L scattered or spurted from the meshing portions of the sun gear 17 and the planetary gears 18, and guides the thus-received lubricating oil L to the planetary gear bearings 20 which rotatably support the respective planetary gears 18.

Namely, as indicated by arrows F in FIGS. 3 and 4, the lubricating oil L which scattered or spurted from the meshing portions of the sun gear 17 and the planetary gears 18 is attached to the horizontal surface 40B and the concaved surface 40C of the covering plate portion 40 making up the doughnut-shaped guide member 38 and the side surfaces of the partition plates 41. The thus-attached lubricating oil L flows down outwardly of the rotating direction, namely, to the bottom plate portion 39 side along the concaved surface 40C of the covering plate portion 40, on the basis of the centrifugal force accompanying the rotation of the doughnut-shaped guide member 38 which rotates together with the carrier 19.

The lubricating oil L which flowed down to the bottom plate portion 39 side flows into the oil holes 19D provided in the support shafts 19B of the carrier 19 through lubricating oil passages 42, and is supplied to the planetary gear bearings 20 trough the longitudinal holes 19D1 and the lateral holes 19D2 of these oil holes 19D, to thereby lubricate the planetary gear bearings 20.

Here, the lubricating oil L which flowed to the bottom plate portion 39 of the doughnut-shaped guide member 38 flows in the rotating direction along the concaved surface 40C of the covering plate portion 40 upon rotation of the doughnut-shaped guide member 38, but this lubricating oil L is blocked by the partition plates 41 provided between the bottom plate portion 39 and the covering plate portion 40. In consequence, the lubricating oil L which accumulated in the space between the partition plates 41 which mutually form pairs can be efficiently guided to the lubricating oil passages 42, so that a large amount of lubricating oil L can be supplied to the planetary gear bearings 20 through the oil holes 19D provided in the support shafts 19B of the carrier 19.

Thus, according to the first embodiment, the lubricating oil L which scattered or spurted from the meshing portions of the sun gear 17 and the planetary gears 18 of the first stage can be received by the doughnut-shaped guide member 38 provided above the first-stage planetary gear reduction mechanism 16, and the thus-received lubricating oil L can be guided to the planetary gear bearings 20 which rotatably support the planetary gears 18. For this reason, the lubrication of these planetary gear bearings 20 can be effected efficiently, thereby making it possible to improve the durability of these planetary gear bearings 20 and, hence, the life of the revolving apparatus 8.

As the lubricating oil L which scattered or spurted from the meshing portions of the sun gear 17 and the planetary gears 18 is interrupted by the doughnut-shaped guide member 38, it is possible to restrain the lubricating oil L from becoming attached to the electric motor 10 provided above the first-stage planetary gear reduction mechanism 16 or from entering the interior of the electric motor 10. For this reason, it is possible to prevent a decline in such as the performance and the durability of the electric motor 10 due to the ingress of the lubricating oil L, thereby making it possible to enhance the reliability of the revolving apparatus 8.

As the covering plate portion 40 of the doughnut-shaped guide member 38 which receives the lubricating oil L covers the meshing portions of the sun gear 17 and the planetary gears 18 over the entire circumference, the covering plate portion 40 is able to reliably receive the lubricating oil L which scattered or spurted from these meshing portions. For this reason, it is possible to increase the amount of lubricating oil L to be guided to the planetary gear bearings 20 and reliably prevent the ingress of the lubricating oil L onto the electric motor 10.

Since the doughnut-shaped guide member 38 has the bottom plate portion 39, the covering plate portion 40, and the lubricating oil passages 42, the doughnut-shaped guide member 38 is able to reliably receive by the covering plate portion 40 the lubricating oil L which scattered or spurted from the meshing portions of the sun gear 17 and the planetary gears 18, and is able to reliably guide to the lubricating oil passages 42 the lubricating oil L received by this covering plate portion 40. Meanwhile, since each support shaft 19B of the carrier 19 is provided with the oil hole 19D in the state of communicating with the lubricating oil passage 42, the lubricating oil L guided to this lubricating oil passage 42 can be reliably supplied to the respective planetary gear bearing 20 through this oil hole 19D.

As the partition plates 41 are provided between the covering plate portion 40 and the bottom plate portion 39, it is possible to secure the strength of the doughnut-shaped guide member 38 by virtue of these partition plates 41. Namely, since the covering plate portion 40 and the bottom plate portion 39 are reinforced by the partition plates 41, it is possible to suppress the deformation of the covering plate portion 40 and the bottom plate portion 39 and prevent damage. In addition, as the lubricating oil L which flowed down from the covering plate portion 40 to the bottom plate portion 39 is blocked from flowing in the rotating direction of the doughnut-shaped guide member 38 by the partition plates 41, a large amount of lubricating oil L can be guided to the lubricating oil passages 42, so that the lubrication of the planetary gear bearings 20 can be effected efficiently.

Moreover, since the lubricating oil passages 20 are each provided between adjacent ones of the partition plates 41 forming pairs, whichever direction the rotating direction of the doughnut-shaped guide member 38 mounted on the carrier 19 may be (whether it may be forward or reverse), the flow of the lubricating oil L can be blocked by the partition plate 41 which is on the backward side in the rotating direction, and this lubricating oil L can be reliably guided to the respective lubricating oil passage 42, thereby making it possible to efficiently effect the lubrication of each planetary gear bearing 20.

Furthermore, since the flange portion 43 is provided on the outer peripheral side of the doughnut-shaped guide member 38 over the entire circumference, this flange portion 43 makes it possible to prevent the level of the lubricating oil L in the vicinity of the inner peripheral surface of the housing 12 from rising and becoming inclined in a concavely conical shape (circular dish shape). As a result, it is possible to restrain the lubricating oil L from becoming insufficient around the first-stage sun gear 17 and to properly lubricate the meshing portions of the sun gear 17 and the planetary gears 18.

Figure 10:
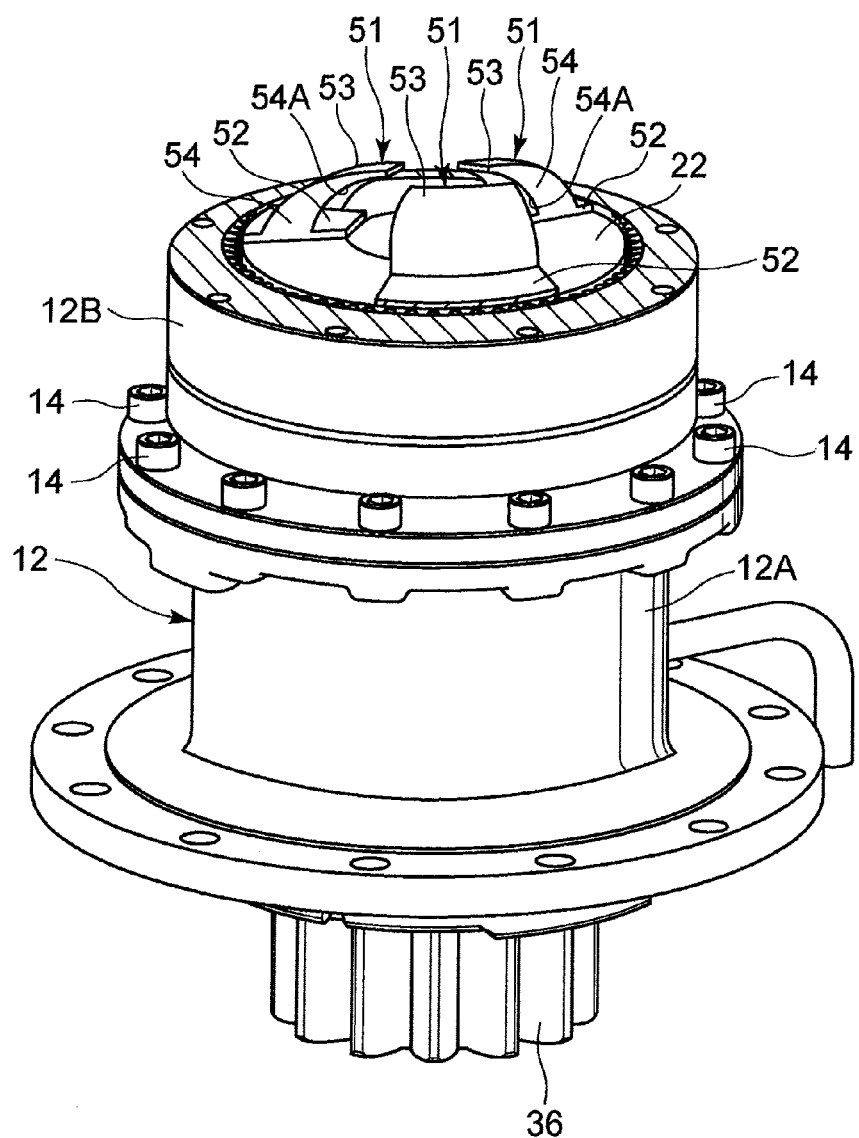
FIG. 10 is a perspective view similar to FIG. 5 and illustrating the housing, segmentary guide members, a pinion, and the like of the revolving apparatus in accordance with a second embodiment of the present invention.
Figure 11:
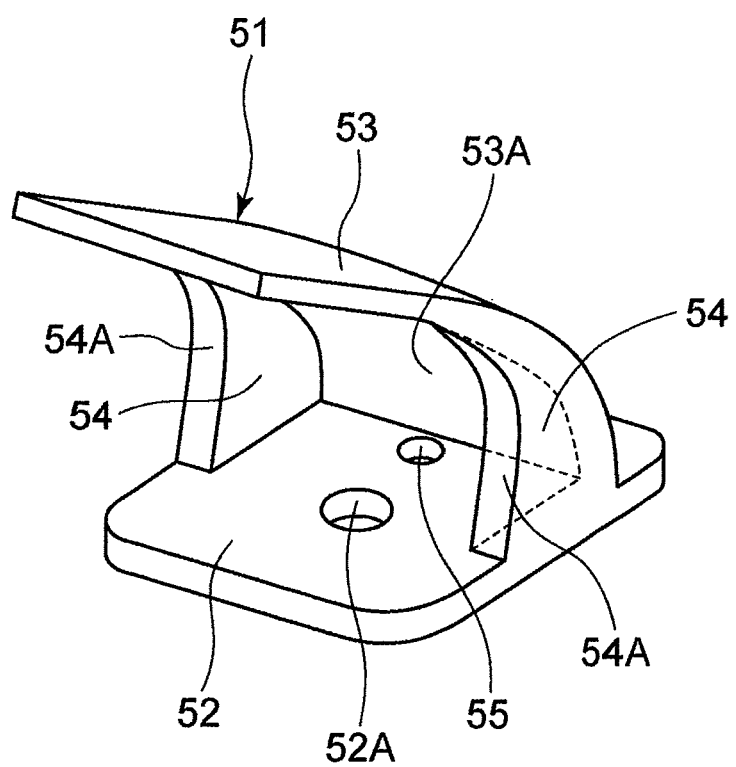
FIG. 11 is a perspective view illustrating the segmentary guide member as a single unit.
Figure 12:
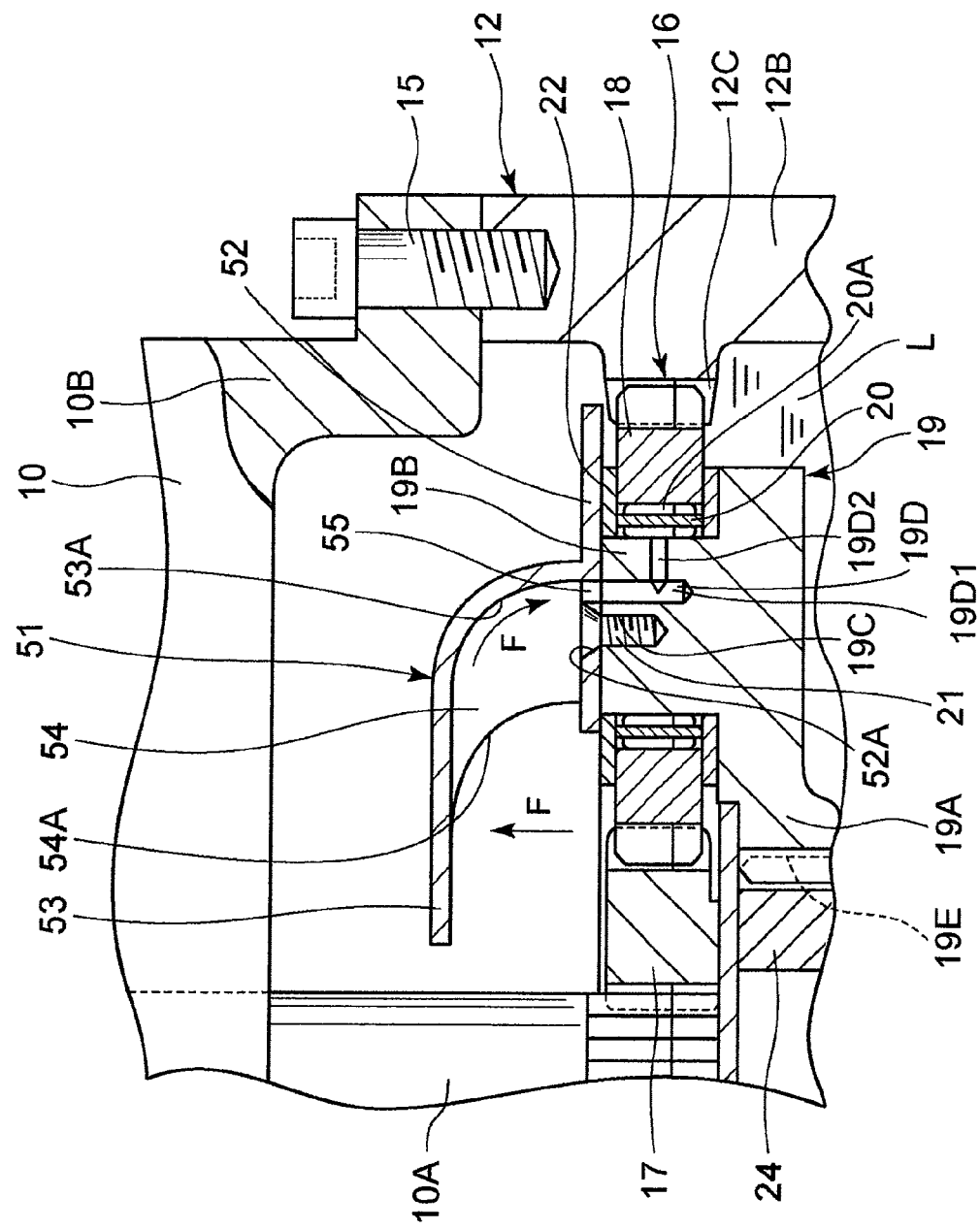

Next, FIGS. 10 to 12 show a second embodiment of the present invention. The characteristic of this embodiment lies in that the lubricating oil guide member is constituted by segmentary guide members which are formed by dividing the lubricating oil guide member into a plurality of segments. In this embodiment, the component elements that are identical to those of the foregoing first embodiment will be simply denoted by the same reference numerals to avoid repetitions of similar explanations.

In the drawings, designated at 51 are a plurality of (for example, three) segmentary guide members serving as the lubricating oil guide member, and the segmentary guide members 51 are used in this embodiment in substitution of the doughnut-shaped guide member 38 in accordance with the first embodiment. Here, each segmentary guide member 51 is fabricated from a material which is lightweight and has strength, such as a synthetic resin, an aluminum alloy, or the like, and is largely constituted by a bottom plate portion 52, a covering plate portion 53, a plurality of partition plates 54, and a lubricating oil passage 55.

Indicated at 52 is the bottom plate portion which is mounted on the carrier 19 of the planetary gear reduction mechanism 16, and the bottom plate portion 52 is provided with a screw through hole 52A in a central portion of a substantially rectangular flat plate. Here, to describe a method of mounting the segmentary guide member 51, as the coupling screw 21 is threadedly engaged, through the screw through hole 52A, with the screw hole 19C provided in the support shaft 19B of the carrier 19, the respective segmentary guide members 51 can be individually mounted on the respective support shafts 19B of the carrier 19.

Indicated at 53 is the covering plate portion for covering the meshing portions of the sun gear 17 and the planetary gears 18. This covering plate portion 53 is formed in a substantially convexly curved shape rising upwardly from the bottom plate portion 52 and extending toward the rotational shaft 10A of the electric motor 10, and its inner surface is formed as a concaved surface 53A. The arrangement provided is such that the concaved surface 53A receives the lubricating oil L which scattered from the meshing portions of the sun gear 17 and the planetary gears 18 of the first stage, and this lubricating oil L is allowed to flow down to the upper surface of the bottom plate portion 52 along the concaved surface 53A due to the centrifugal force, so as to be guided to the below-described lubricating oil passage 55.

Indicated at 54 are a pair of partition plates which are provided between the bottom plate portion 52 and the covering plate portion 53. The partition plates 54 are for partitioning the space between the bottom plate portion 52 and the covering plate portion 53. Here, the partition plates 54 are formed as a pair by being located on radially opposite sides of the support shaft 19B of the carrier 19 in a state in which the bottom plate portion 52 is mounted on the carrier 19. Accordingly, the partition plates 54 function to block the lubricating oil L attached the concaved surface 53A of the covering plate portion 53 from flowing in the circumferential direction and to guide that lubricating oil L to the below-described lubricating oil passage 55.

In addition, a notch 54A which is concaved from a distal end portion toward a proximal end side of the covering plate portion 53 is provided at an edge portion of each partition plate 54. The arrangement provided is such that the coupling screw 21 for mounting the bottom plate portion 52 of the segmentary guide member 51 to the support shaft 19B of the carrier 19 can be fastened by inserting a tool such as a screwdriver below the inner side of the covering plate portion 53 through this notch 54A.

Indicated at 55 is the lubricating oil passage which is provided in the bottom plate portion 52 at a position closer to the proximal end portion side of the covering plate portion 53 than the screw through hole 52A. The arrangement provided is such that in the state in which the bottom plate portion 52 of the segmentary guide member 51 is mounted on the support shaft 19B of the carrier 19 by using the coupling screw 21, the lubricating oil passage 55 communicates with the oil hole 19D provided in this support shaft 19B. Accordingly, the arrangement provided is such that the lubricating oil L, which scattered or spurted from the meshing portions of the sun gear 17 and the planetary gears 18, flows down to the bottom plate portion 52 along the inner surface of the covering plate portion 53 and the side surfaces of the partition plates 54 and is subsequently guided from the lubricating oil passage 55 to the planetary gear bearing 20 through the oil hole 19D provided in the support shaft 19B of the carrier 19.

According to the revolving apparatus 8 in accordance with the second embodiment, the segmentary guide members 51 are for individually covering the respective meshing portions of the sun gear 17 and the planetary gears 18. As a result, the respective segmentary guide members 51 are able to receive the lubricating oil L which scattered or spurted from these meshing portions and guide the received lubricating oil L to the planetary gear bearings 20 for rotatably supporting the respective planetary gears 18. Accordingly, in this embodiment as well, it is possible to obtain operational effects similar to those of the above-described first embodiment.

Moreover, in the second embodiment, since the respective meshing portions of the sun gear 17 and the planetary gears 18 are arranged to be individually covered by the plurality of (three) segmentary guide members 51, in the event that any one of the segmentary guide members 51 has been damaged, it suffices to replace only that damaged segmentary guide member 51, and the other segmentary guide members 51 can continue to be used intact as they are. For this reason, the replacement of the segmentary guide members 51 can be performed easily, and the cost required for replacement can be reduced.

In addition, the partition plate 54 of the segmentary guide member 51 is provided with the notch 54A, the tool for threadedly engaging the coupling screw 21 can be easily inserted inner side the segmentary guide member 51, thereby making it possible to enhance the operational efficiency at the time of mounting or dismounting this segmentary guide member 51.

Figure 13:
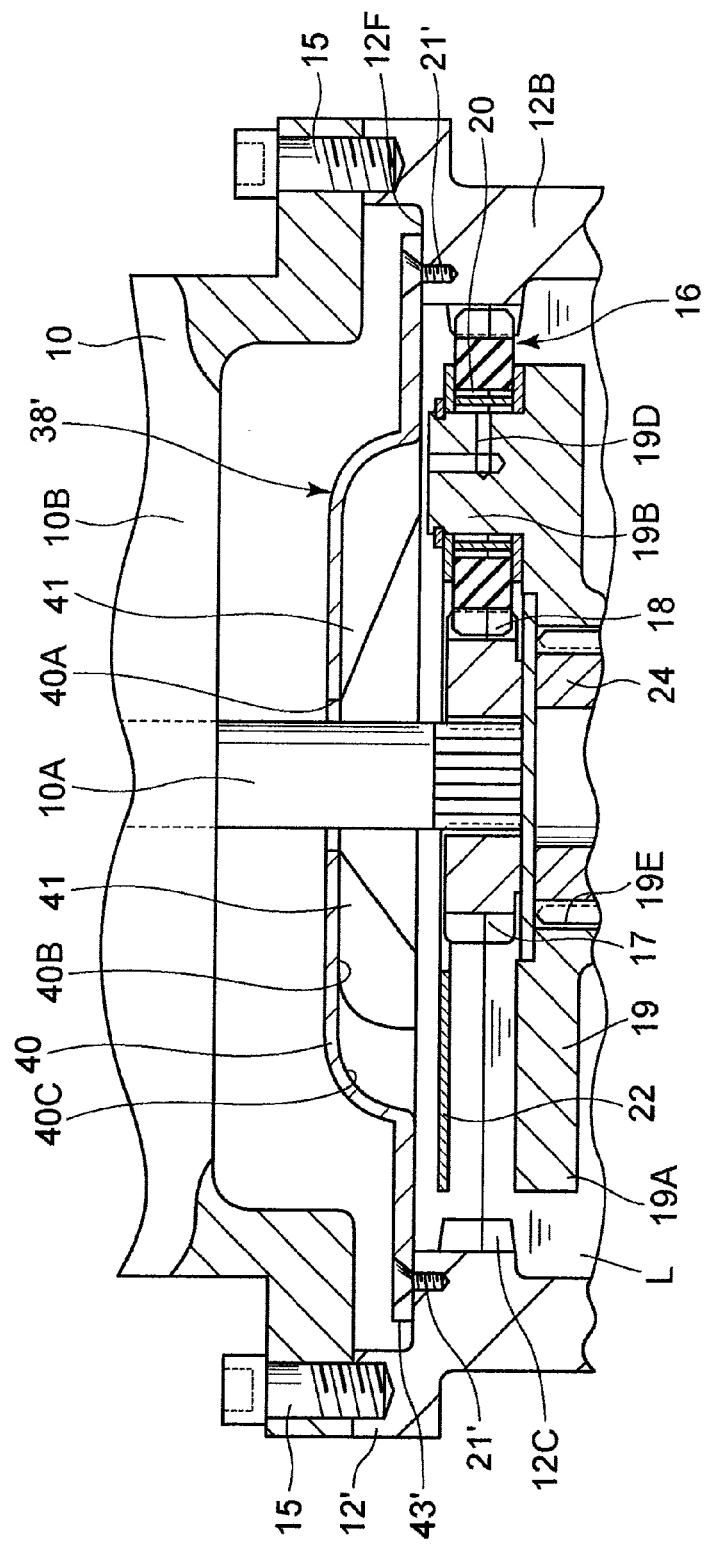
FIG. 13 is an enlarged cross-sectional view of essential portions at a position similar to that of FIG. 3 and illustrating a revolving motor, the housing, the planetary gear reduction mechanism, the doughnut-shaped guide member, and the like in accordance with a first modification of the present invention.

It should be noted that, in the above-described first embodiment, it is explained by citing as an example the case in which the doughnut-shaped guide member 38 is mounted on the carrier 19. However, the present invention is not limited to the same, and as shown in FIG. 13 it is possible to adopt a construction in which an outer peripheral edge portion of a doughnut-shaped guide member 38' is mounted on a housing 12'. In this case, for example, an annular stepped portion 12F is provided on an inner peripheral surface of an upper end side of the housing 12' over the entire circumference, and, in a state in which a radially outwardly extended flange portion 43' is abutted against this stepped portion 12F, a coupling screw 21' inserted in the flange portion 43' is threadedly engaged with the stepped portion 12F, thereby making it possible to easily mount the doughnut-shaped guide member 38'.

In the above-described first embodiment, it is explained by citing the case in which the partition plates 41 are provided between the bottom plate portion 39 and the covering plate portion 40 for making up the doughnut-shaped guide member 38. However, the present invention is not limited to the same, and it is possible to adopt, for example, a construction in which the partition plates are omitted. In this case, the doughnut-shaped guide member can be constructed simply with light weight, and it is possible to easily effect the formation of the doughnut-shaped guide member and reduce the manufacturing cost. This similarly applies also to the segmentary guide members 51 in accordance with the second embodiment.

Figure 14:
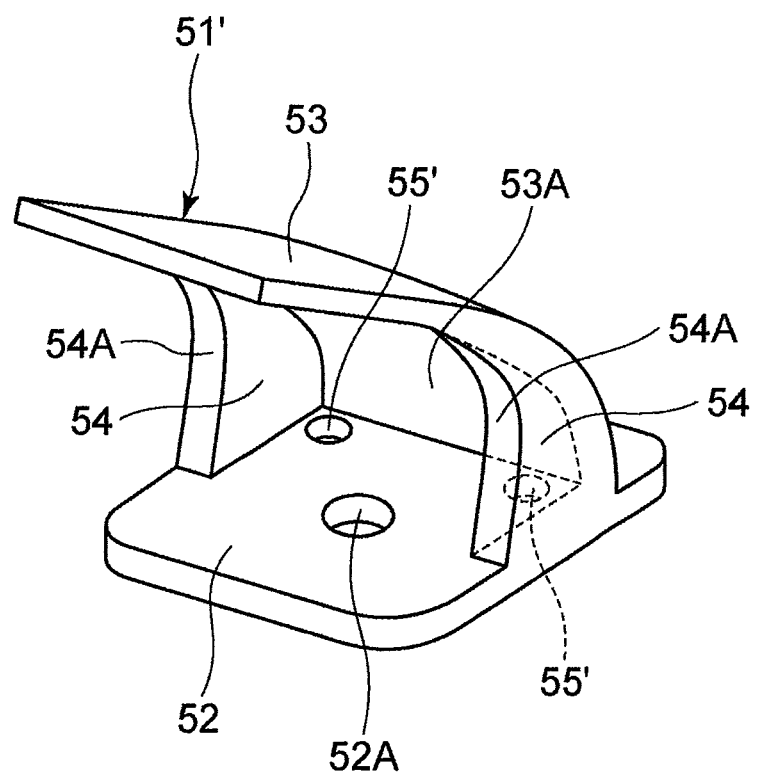
FIG. 14 is a perspective view similar to FIG. 11 and illustrating the segmentary guide member as a single unit in accordance with a second modification of the present invention.

In the above-described second embodiment, it is explained by citing as an example the segmentary guide member 51 in which one lubricating oil passage 55 is provided in the bottom plate portion 52. However, the present invention is not limited to the same, and it is possible to adopt a construction in which, for example, a total of two lubricating oil passages 55' are respectively provided in the vicinities of the pair of partition plates 54 as in a segmentary guide member 51' shown in FIG. 14. In this case, two oil holes corresponding to the two lubricating oil passages 55' are provided in the respective support shafts of the carrier where the segmentary guide members 51' are mounted, thereby making it possible to efficiently guide the lubricating oil L to the planetary gear bearing whichever direction the rotating direction of the carrier may be. This similarly applies also to the doughnut-shaped guide member 38 in accordance with the first embodiment.

In the above-described second embodiment, it is explained by citing as an example the case in which one screw through hole 52A is provided in the bottom plate portion 52 for making up the segmentary guide member 51, and the segmentary guide members 51 are each mounted on the carrier 19 by means of one coupling screw 21. However, the present invention is not limited to the same, and it is possible to adopt a construction in which a plurality of screw through holes are provided, and the segmentary guide members are each mounted on the carrier by means of a plurality of coupling screws.

In the above-described embodiments, it is explained by citing as an example the case in which the needle bearing which is a rolling bearing, is used as the planetary gear bearing 20 for supporting the planetary gear 18, the present invention is not limited to the same, and it is possible to adopt a construction in which a sliding bearing such as a sleeve and the like is used.

In the above-described embodiments, it is explained by citing as an example the case in which the support shaft 19B for supporting the planetary gear 18 is integrally formed with the support plate 19A for forming the carrier 19. However, the present invention is not limited to the same, and it is possible to adopt a construction in which, for example, a pin constituted by a member different from the support plate for making up the carrier is fixed to this support plate.

In the above-described embodiments, although it is explained by citing as an example the case in which an electric motor is used as the revolving motor, the present invention is not limited to the same, and it is possible to adopt a construction in which, for example, a hydraulic motor is used.

In the above-described embodiments, it is explained by citing as an example the case in which the planetary gear reduction mechanisms 16, 23, and 28 of three stages are provided in the housing 12. However, the present invention is not limited to the same, and it is possible to adopt a construction in which, for example, a planetary gear reduction mechanism of a single stage or planetary gear reduction mechanisms of two stages are provided in the housing 12, or a construction in which, for example, planetary gear reduction mechanisms of four or more stages are provided in the housing 12.

In the above-described embodiments, although it is explained by citing as an example the case in which the planetary gear reduction mechanisms 16, 23, and 28 of the carrier rotation type are provided, it is possible to adopt a construction in which, for example, planetary gear reduction mechanisms of the carrier fixed type are used.

Furthermore, in the above-described embodiments, although it is explained by citing as an example the case in which the revolving apparatus is applied to a hydraulic excavator, the present invention is not limited to the same, and the revolving apparatus may be widely applied to other construction machines such as a hydraulic crane.

DESCRIPTION OF REFERENCE NUMERALS

1: Lower traveling structure
2: Upper revolving structure

8: Revolving apparatus
10: Electric motor (Revolving motor)
10A: Rotational shaft
12, 12': Housing
12C: Internal teeth
16, 23, 28: Planetary gear reduction mechanism
17, 24, 29: Sun gear
18, 25, 30: Planetary gear
19, 26, 31: Carrier
19B: Support shaft
19D: Oil hole
20: Planetary gear bearing
33: Output shaft
36: Pinion
37: Revolving ring
37A: Inner race
38, 38': Doughnut-shaped guide member (Lubricating oil guide member)
39, 52: Bottom plate portion
39A: Shaft through hole
40, 53: Covering plate portion
41, 54: Partition plate
42, 55, 55': Lubricating oil passage
43, 43': Flange portion
51, 51': Segmentary guide member (Lubricating oil guide member)
L: Lubricating oil

The invention claimed is:

1. A revolving apparatus for a construction machine including a tubular housing on an upper end side of which a revolving motor is provided and whose lower end side is mounted on an upper revolving structure; a planetary gear reduction mechanism provided in said housing to reduce a speed of rotation of said revolving motor; an output shaft which extends in an upper and a lower direction within said housing and outputs a rotation whose speed has been reduced by said planetary gear reduction mechanism; and a pinion which is provided on a lower end side of said output shaft and meshes with an inner race of a revolving ring provided between said upper revolving structure and a lower traveling structure;
wherein said planetary gear reduction mechanism being constituted by a sun gear, a plurality of planetary gears which mesh with said sun gear and internal teeth provided on an inner side of said housing and revolve around said sun gear while rotating, and a carrier which has a plurality of support shafts for supporting said respective planetary gears, said planetary gears being respectively provided rotatable on said support shafts by means of planetary gear bearings, lubricating oil for lubricating said planetary gear reduction mechanism being held in said housing,
wherein a lubricating oil guide member for covering meshing portions of said sun gear and said planetary gears and for receiving the lubricating oil scattered from the meshing portions and guiding the same to said planetary gear bearings is provided at an upper position of said planetary gear reduction mechanism, and
wherein said lubricating oil guide member includes;
a bottom plate portion which is mounted on an upper end surface of each of said support shafts of said carrier;
a covering plate portion which rises upwardly from said bottom plate portion, extends towards said rotational shaft of said revolving motor, and covers the meshing portions of said sun gear and said planetary gears; and
lubricating oil passages which are provided in said bottom plate portion and guide to said planetary gear bearings said lubricating oil which flowed down to said bottom plate portion said along said covering plate portion.

2. The revolving apparatus for a construction machine according to claim 1, wherein said lubricating oil guide member is constituted by a doughnut-shaped guide member which has a shaft through hole for a rotational shaft of said revolving motor to be inserted therethrough and covers the meshing portions of said sun gear and said planetary gears over an entire circumference.

3. The revolving apparatus for a construction machine according to claim 1, wherein a flange portion extending toward an inner peripheral surface of said housing is arranged to be provided on an outer peripheral side of said lubricating oil guide member over an entire circumference.

4. The revolving apparatus for a construction machine according to claim 1, wherein said lubricating oil guide member is formed by segmentary guide members which is divided into a plurality of segments, the meshing portions of said sun gear and said planetary gears being arranged to be individually covered by said segmentary guide members.

5. The revolving apparatus for a construction machine according to claim 1, wherein an oil hole for guiding the lubricating oil to said planetary gear bearing is provided in said support shaft of said carrier, and said lubricating oil passages of said lubricating oil guide member are each arranged to be provided at a position corresponding to said oil hole of said support shaft.

6. The revolving apparatus for a construction machine according to claim 1, wherein a plurality of partition plates which form pairs by being located on radially opposite sides of said respective support shafts of said carrier so as to partition a space between said bottom plate portion and said covering plate portion is provided between said bottom plate portion and said covering plate portion for making up said lubricating oil guide member, each of said lubricating oil passages being arranged to be provided between said partition plates.

* * * * *